United States Patent [19]

Yoshida

[11] 3,878,543

[45] Apr. 15, 1975

[54] SENSING CIRCUIT FOR USE IN CORE MEMORY

[75] Inventor: Kazutoshi Yoshida, Mobara, Japan

[73] Assignee: Hitachi, Ltd., Tokyo, Japan

[22] Filed: Dec. 21, 1973

[21] Appl. No.: 427,127

[30] Foreign Application Priority Data

Dec. 29, 1972 Japan .................................. 48-3053
Dec. 25, 1972 Japan .............................. 48-129269

[52] U.S. Cl. .................. 340/174 AD; 340/174 DA; 340/174 M

[51] Int. Cl. ............................................ G11c 11/06

[58] Field of Search .. 340/174 AD, 174 DA, 174 M

[56] References Cited

UNITED STATES PATENTS 3,142,049 7/1964 Crawford ..................... 340/174 DA

*Primary Examiner*—James W. Moffitt
*Attorney, Agent, or Firm*—Craig & Antonelli

[57] ABSTRACT

A sensing circuit for use in a core memory, in which sense lines passing through magnetic cores have near-ends connected with an amplifier and with first termination resistors and far-ends connected with second termination resistors, the first termination resistors having a resistance higher than the characteristic impedence of the sense lines while the resistance of the second termination resistors is equal to or lower than the characteristic impedance of the sense lines.

2 Claims, 9 Drawing Figures

SENSING CIRCUIT FOR USE IN CORE MEMORY

The present invention relates to a sensing circuit for use in a core memory.

An object of the present invention is to provide a sensing circuit for a core memory capable of producing a read-out output higher than a predetermined level independently of the distance between the memory core in which the information to be read out is stored and the sense amplifier along the sense line.

The above object can be achieved by the present invention by making the resistance of the termination resistors connected between the near-ends of the sense lines higher than the characteristic impedance of the sense lines and by connecting additional termination resistors having a resistance not higher than the caracteristic impedance of the sense lines between the far-ends of the sense lines.

Other objects and features of the present invention will be apparent from the following description with reference to the accompanying drawings, in which.

The core memory is a memory employing a plurality of magnetic cores for writing and reading information and a sensing circuit is utilized for reading information therefrom. In a three-dimensional coincident current memory the inhibit winding and the sense winding are utilized in common, while in a two-dimensional word-organized memory the digit line and the sense line are utilized in common. In both types of memories the lines act as sense lines at the reading time and used for reading sense signals. At the writing time they act as bit lines, and when necessary write-in currents are allowed to flow therethrough. In other words, in the coincident current memory an inhibit current flows through the inhibit line for writing "0" in the memory, while in the word-organized memory a bit current flows through the bit line for writing 1 therein.

For the sake of simplicity the following description will be made of the sensing circuit for the three-dimentional coincident current memory.

Figure 1:
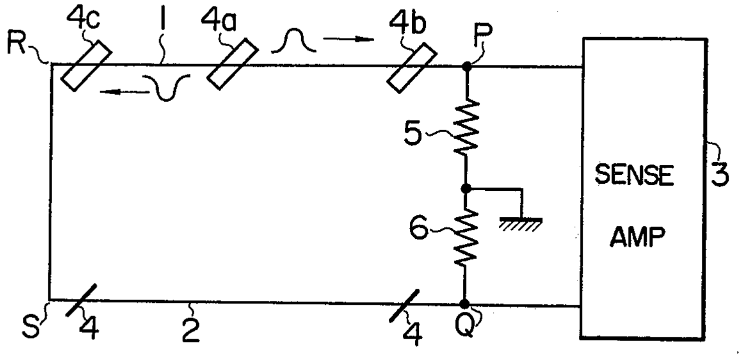
FIG. 1 PRIOR ART
FIG. 1 is an example of the conventionally used sensing circuit for a core memory.

FIG. 1 shows a conventional sensing circuit in which the far-ends R and S of sensing lines 1 and 2 are connected in common. Termination resistors 5 and 6 are connected in series between the near-ends P and Q thereof. The junction point of the termination resistors 5 and 6 is grounded. The termination resistors 5 and 6 have a resistance equal to the characteristic impedance of the sense lines 1 and 2. The sense lines 1 and 2 pass through magnetic cores 4, 4*a*, 4*b* and 4*c*, and a sense amplifier 3 for amplifying the read-out information signal is connected between the near-ends P and Q.

Figure 2:
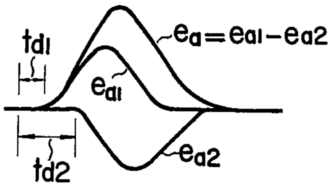
FIGS. 2 and 3 are diagrams of output waveforms of the sensing circuit of FIG. 1.

In such a sensing circuit for the core memory as constructed as above, a signal produced by the selected core 4*a* on the sense line 1 is divided into two signals of opposite polarities as shown in FIG. 1, one of which proceeds towards the near-point P of the sense line 1 (as viewed from the sense amplifier 3) and the other of which proceeds towards the near-point Q through the sense line 2 in the opposite phase. The signals thus proceeding in the opposite directions are absorbed (non-reflection) by the termination resistors 5 and 6, respectively. The voltage waveforms at the points P and Q in this state are as shown in FIG. 2. The waveform $e_{al}$ at the point P has a time lag $t_{dl}$ corresponding to the distance between the core 4*a* and the point P, and the waveform $e_{a2}$ at the point Q has the time lag $t_{d2}$ corresponding to the distance between the core 4*a* and the point Q. The input signal to the sense amplifier 3, i.e., the waveform between the points P and Q is the composite voltage waveform $e_{al}$ - $e_{a2}$ of the voltage waveformes $e_{al}$ and $e_{a2}$.

Figure 3:
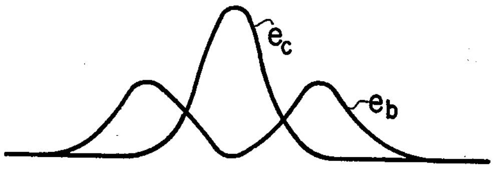

However, in the sensing circuit of the above structure for the core memory, the magnitude of the output signal varies depending on the position of the selected core so that the disadvantage results that the signal-to-noise ratio is reduced. When a core near the far-end R or S, for example the core 4*c* is selected, the time lags $t_{dl}$ and $t_{d2}$ of the signals to reach the near-points P and Q are approximately equal to each other so that the peak voltage between the near-ends P and Q, i.e., the composite signal $e_c$ thereof is almost equal to the output signal of the core as shown in FIG. 3. However, when a core near the near-end P, for example the core 4*b* is selected, the difference between the times necessary for the signals to reach the points P and Q is very large so that the voltage waveform between the points P and Q is one $e_b$ having two peaks of individual independent signals as shown in FIG. 3. Thus, the peak voltage in this case is about a half of that in the former case.

Figure 4:
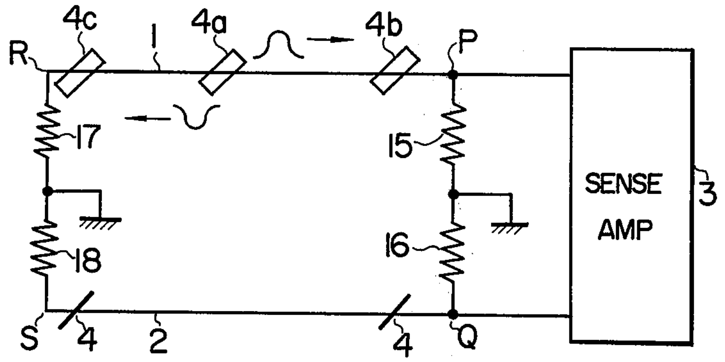
FIG. 4 is an embodiment of the sensing circuit according to the present invention.
Figure 5:
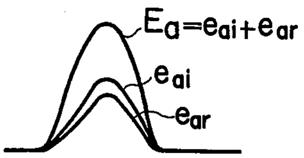
FIGS. 5 and 6 are diagrams of waveforms of the sensing circuit of FIG. 4.

FIG. 4 shows an embodiment of the sensing circuit according to the present invention. Similar parts to those in FIG. 1 are designated by similar reference characters or numerals. Reference numerals 15 and 16 designate termination resistors connected between the near-ends P and Q of the sense lines 1 and 2 and the ground, respectively. The resistance of the termination resistors 15 and 16 is determined to be larger than the characteristic impedance of the sense lines 1 and 2. Additional termination resistors 17 and 18 are connected in series between the far-ends R and S of the sense lines 1 and 2 and the junction point between the termination resistors 17 and 18 is grounded. The resistance of the termination resistors 17 and 18 is determined to be equal to the characteristic impedance of the sense lines 1 and 2.

In this arrangement, if the magnetic core 4*a*, for example, is selected, the output signal thereof is divided into two signals of opposite polarities as shown which travel towards the near-end P and the far-end R. The signal travelling towards the far-end R is absorbed by the termination resistor 17 and not reflected due to the resistance of the termination resistor 17 being the same as the characteristic impedance of the sense line 1. Consequently, the signal travelling towards the far-end R of the sense line 1 exerts no influence on the input signal to the sense amplifier 3. On the other hand, the signal travelling towards the near-end P is reflected by the termination resistor 15 due to its resistance being larger than the characteristic impedance of the sense line 1. Consequently, the potential $E_a$ at the near-point P is the superimposition of the incident potential waveform $e_{ai}$ and the reflected potential waveform $e_{ar}$ due to the existance of the termination resistor 15 on each other, i.e., $E_a = e_{ai} + e_{ar}$. This composite signal sensed is the input signal to the sense amplifier 3. In this case, the reflection coefficient Γ at the near-end P of the sense line 1 is determined by the characteristic impedance $Z_o$ of the sense line 1 and the resistance $R_p$ of the termination resistor 15 as follows:

$$\Gamma = \frac{R_p - Z_o}{R_p + Z_o}$$

Since the resistance $R_p$ of the termination resistor 15 is larger than the characteristic impedance $Z_o$ of the sense line 1, the reflection coefficient Γ is positive. If the resistance of the termination resistor 15 is made very large, the reflection coefficient approaches 1, when the magnitude or the sensed signal is twice the incident voltage waveform, in other words, it approaches the magnitude of the output signal of the core. Consequently, the termination resistors 15 and 16 can release the near-ends P and Q from the ground.

The signal reflected by the near-end P reaches the far-end R to be absorbed by the termination resistor 17 so that it does not affect the input to the sense amplifier 3. In the embodiment of FIG. 4, it is sufficient that the characteristic impedance of the sense lines 1 and 2 and the resistance of the far-end termination resistors 17 and 18 are about 50 – 200 Ω, and the resistance of the near-end termination resistors 15 and 16 is about 1000 Ω -∞(infinity).

Figure 6:
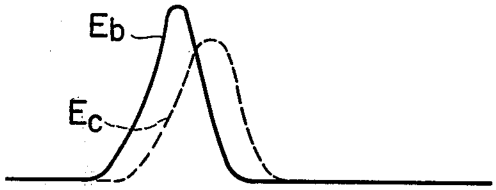

However, it is inevitable that in the sensing circuit of FIG. 4 the read out information signal attenuates while it runs on the sense line to the sense amplifier. Consequently, there occurs a difference in the intensity between the signal produced by the core 4*c* near the far-end R and the signal produced by the core 4*b* near the near-end P. That is, the sensed signal $E_b$ which is the input signal to the sense amplifier 3 produced by the core 4*b* is high, while the sensed signal $E_c$ produced by the core 4*c* is not only low due to attenuation but also subjected to time lag as shown in FIG. 6. The difference in the intensity between the signals gives rise to the possibility that the signal-to-noise ratio is reduced.

Figure 7:
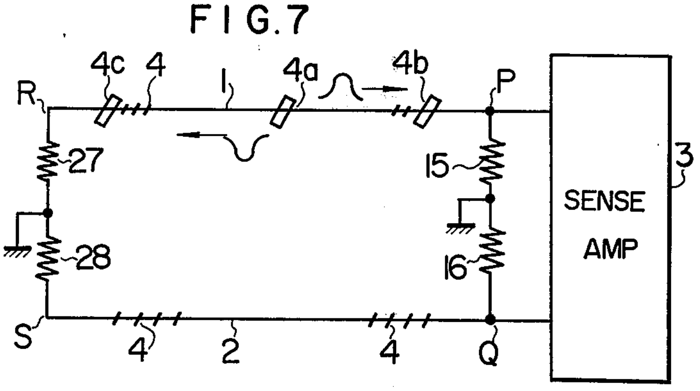
FIG. 7 is another embodiment of the sensing circuit according to the present invention.

FIG. 7 is another embodiment of the sensing circuit according to the present invention, in which similar parts to those in FIG. 4 are designated by similar reference characters or numerals. The difference of the circuit of FIG. 7 from that of FIG. 4 is that the resistance of the termination resistors 27 and 28 to be arranged across the far-ends R and S of the sense lines 1 and 2 is lower than the characteristic impedance of the sense lines 1 and 2 as against the equality.

Figure 8:
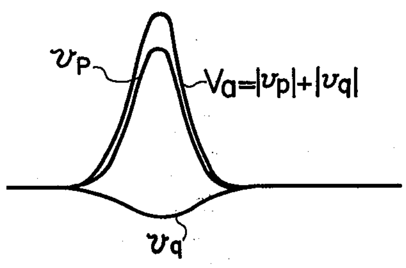
FIG. 8 is a diagram of a waveform of the sensing circuit of FIG. 7.

Then, the signal running towards the far-end R passes through the termination resistors 27 and 28 towards the near-end Q. A part of the signal produced by the core 4*c*, for example, near the far-end R travels while attenuating towards the near-end P to produce an attenuated sensed signal $v_p$ at the near-end P as shown in FIG. 8. On the other hand, the signal reaching the far-end R passes through the termination resistors 27 and 28 to travel on the sense line 2 towards the near-end Q and produces at the near-end Q a low voltage signal waveform $v_q$ of the opposite polarity a shown in FIG. 8.

Then, the sensed signal $V_a$ to be supplied to the sense amplifier 3 is the difference between the potential signal $v_p$ at the point P and the potential signal $v_q$ at the point Q, i.e., $V_a = v_p - v_q$. Here, since the signal $v_q$ at the point Q is of the opposite polarity to the signal $v_p$ at the point P, the sensed signal $V_a = |v_p| + |v_q|$ becomes larger than the voltage $v_p$ at the point P as shown in FIG. 8. As a result, the signal produced by a core near the far-end R of the sense line 1 is supplied to the sense amplifier 3 in the state that it is higher than the signal in the conventional arrangement so that the difficulty of the difference in the intensity of the sensed signal due to the production position on the sense line can be obviated.

Figure 9:
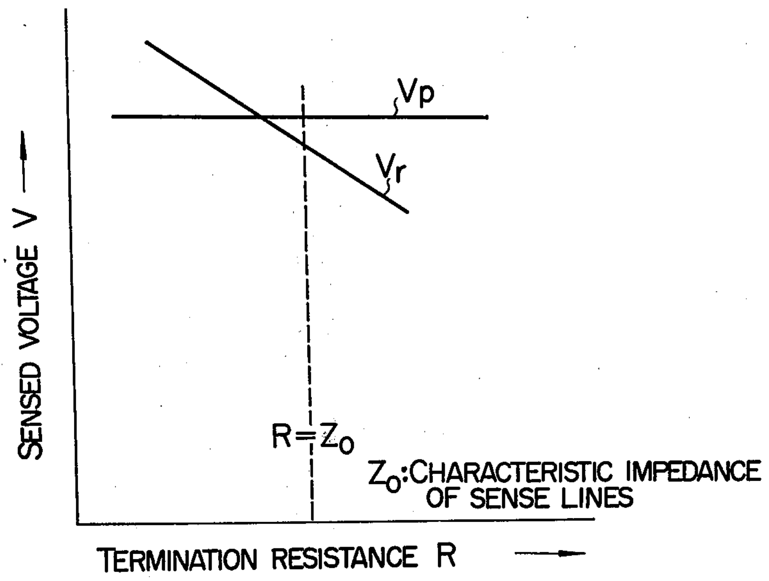
FIG. 9 is a sensed voltage versus termination resistance characteristic of the sensing circuit of FIG. 7.

FIG. 9 shows the variations of the sensed voltages $V_r$ and $V_p$ produced by cores near the far-end R and the near-end P, respectively, relative to the variation of the resistance of the far-end termination resistors 27 and 28. As seen, the sensed signal $V_p$ produced by the core near the near-end P is substantially independent of the variation in the resistance of the termination resistors 27 and 28, while the sensed signal $V_r$ produced by the core near the far-end R increases with the decrease in the resistance of the termination resistors 27 and 28. In the sensing circuit for the core memory it is desirable that the sensed signal produced by the core near the far-end and that produced by the core near the near-end are substantially equal to each other from the standpoint of the afore-mentioned signal-to-noise ratio. In order to meet such a condition it is preferable to determine the resistance of the termination resistors to be 70 to 90 percent of the characteristic impedance of the sense lines as seen from FIG. 9. In this case, though the attenuation of noise degrades if the resistance of the termination resistors is decreased, no difficulty would occur in the above range. In the embodiment of FIG. 7 it is sufficient that the characteristic impedance of the sense lines 1 and 2 is 50 –200 Ω, the resistance of the far-end termination resistors 27 and 28 is 35 – 180 Ω, and the resistance of the near-end termination resistors 15 and 16 is 1000 Ω -∞ (infinity).

I claim:

1. In a sensing circuit for use in a core memory, said sensing circuit comprising:

a pair of sense lines passing through magnetic cores and having near-ends and far-ends;

a sense amplifier connected across the near-ends of said pair of sense lines;

a pair of first termination resistors connected between the near-ends of said sense lines and ground, in which said first termination resistors have a resistance higher than the characteristic impedance of said sense lines, and a pair of second termination resistors connected between said far-ends of said sense lines and ground;

the improvement wherein:

the resistance of said second termination resistors is smaller than the characteristic impedance of said sense lines.

2. The improvement according to claim 1, wherein the resistance of said second termination resistors is about 0.7 – 0.9 times the characteristic impedance of said sense lines.

* * * * *